(12) United States Patent
Huang

(10) Patent No.: US 9,147,300 B2
(45) Date of Patent: Sep. 29, 2015

(54) INTELLIGENT DOCUMENT WITH STORED TEXT AND IMAGE

(75) Inventor: Su Shiong Huang, Belleville, WA (US)

(73) Assignee: LOCHINTECH CORPORATION, San Jose, CA (US)

( * ) Notice: Subject to any disclaimer, the term of this patent is extended or adjusted under 35 U.S.C. 154(b) by 393 days.

(21) Appl. No.: 12/928,852

(22) Filed: Dec. 20, 2010

(65) Prior Publication Data

US 2012/0155700 A1    Jun. 21, 2012

(51) Int. Cl.
| | |
|---|---|
| *H04B 3/00* | (2006.01) |
| *G07D 7/00* | (2006.01) |
| *H04N 1/32* | (2006.01) |
| *G07D 7/20* | (2006.01) |
| *B42D 25/29* | (2014.01) |

(52) U.S. Cl.
CPC .............. *G07D 7/0033* (2013.01); *B42D 25/29* (2014.10); *G07D 7/0093* (2013.01); *G07D 7/2033* (2013.01); *H04N 1/32138* (2013.01); *B42D 2033/46* (2013.01); *H04N 2201/3233* (2013.01); *H04N 2201/3235* (2013.01); *H04N 2201/3238* (2013.01); *H04N 2201/3269* (2013.01); *H04N 2201/3274* (2013.01)

(58) Field of Classification Search
CPC .......... G06K 19/07749; G06K 7/0008; G06K 19/0723; G06K 19/07758; H01Q 1/2225
USPC ................. 340/1.1, 5.1, 5.8, 5.86, 10.1–10.6, 340/572.1–572.9; 235/375–385; 715/200
See application file for complete search history.

(56) References Cited

U.S. PATENT DOCUMENTS

| | | | | |
|---|---|---|---|---|
| 7,170,391 B2 * | 1/2007 | Lane et al. | .................... | 340/5.82 |
| 7,450,253 B2 * | 11/2008 | Kiwada | ........................ | 358/1.14 |
| 7,731,093 B2 * | 6/2010 | Isemura et al. | ............... | 235/492 |
| 7,961,337 B2 * | 6/2011 | Yamamoto et al. | .......... | 358/1.14 |
| 8,094,341 B2 * | 1/2012 | Miyata | ......................... | 358/1.16 |
| 2010/0007710 A1 * | 1/2010 | Miyaso | ......................... | 347/110 |

* cited by examiner

Primary Examiner — James Yang

(57) ABSTRACT

A self-authenticating intelligent document in sheet medium form has an information storage and transfer means incorporated thereinto for storing the original text portion of document information formed on the surface of the sheet medium and for storing an image of the completed document after supplemental information has been added to the original text portion on the surface of the sheet medium. The information storage and transfer means is either a single RFID tag having a first memory portion for storing the text portion and a second memory portion for storing the image of the completed document; or a first RFID tag having a memory portion for storing the text portion and a second RFID tag for storing the image of the completed document. To verify the authenticity of the document, the image stored in the information storage and transfer means is read out and compared with the visible version. When the two are identical, the document is authentic.

6 Claims, 11 Drawing Sheets

RFID Tag12 Memory Map

| ZONE 0 | ZONE 1 | ZONE 2 and more zones |
|---|---|---|
| Manufacture information, serial number,.. (Read only) | Organization information (one time write only) | Text Information (one time write only) |

RFID Tag14 Memory Map

| ZONE 0 | ZONE 1 | ZONE 2 and more zones |
|---|---|---|
| Manufacture information, serial number,.. (Read only) | Organization information (one time write only) | Image Information (one time write only) |

FIG.4

RFID Tag 62 Memory Map

| ZONE 0 | ZONE 1 | ZONE 2 | ZONE 3 to ZONE 15 |
|---|---|---|---|
| Manufacture information, serial number,. (Read only) | Organization information (one time write only) | Text information (one time write only) | Image information (one time write only) |

FIG.9

TEXT Information

| | |
|---|---|
| Title | Certificate of Title |
| Organization | State of California |
| Document No | 23556789 |
| Issue Date | 10/26/1996 |
| Class | AUTOMOBILE |
| Vehicle ID | 1HGCA6544TB0327739 |
| Model | Accord 1996 |
| Make | Hond |
| Registered Owner | Bob Smith |
| | 1234 Abc St. San Jose CA 95186 |

INTELLIGENT DOCUMENT WITH STORED TEXT AND IMAGE

BACKGROUND OF THE INVENTION

This invention relates to document preparation, storage, and retrieval. More particularly, this invention relates to a method and system for creating documents on sheet media which contain both visible and electronic versions of information and the documents produced thereby.

Sheet media documents are universally used for recording information for later reference. Originally prepared by hand, such documents are now frequently created by machines such as typewriters, word processors and personal computers. When created by hand, the original document is typically stored in some fashion, typically in an envelope or a file folder, for future reference. Machine copies are typically made and distributed to all persons having a perceived need for the copy and the information contained therein. When created using word processors and personal computers, the information comprising the document under creation is first manually entered using a keyboard to produce an electronic version, followed by printing a viewable version of the document on sheet media, such as plain paper. The electronic version is either permanently stored using some form of memory (such as a magnetic tape or disk), or erased from the temporary machine memory. If permanently stored, the document information may be later recalled and used to produce another sheet media copy. If erased, the electronic version is forever lost for future reference.

Existing documents in sheet media form are typically copied, when necessary, by means of a copying machine or a scanner attached to a computer. If an electronic version of the original sheet media document exists, a copy can be produced from the electronic version using conventional word processing copy routines. However, unless the electronic version of the document is stored in a completely unalterable manner, there is no guarantee that the reproduced version is identical to the original version.

The historical integrity of a sheet media document is only as good as the security procedures controlling the custodial process for the document. Important documents have been known to be altered for various improper purposes, in spite of security procedures which, on their face, would appear to prevent such document corruption. When an original, genuine document is altered in an unauthorized manner, the integrity of the document is compromised, which is highly undesirable.

U.S. Patent Application no. U.S. 2004/0044956 A1 published Mar. 4, 2004 discloses a method and system for creating documents on sheet media which guarantees the authenticity of the original document. Each original document contains both visible and unalterable electronic versions of the original information comprising the document. Each document optionally contains a visible indicator for facilitating the identification of a document under search in a storage facility containing many documents. More specifically, the original document comprises a sheet medium, such as paper or plastic, for providing a surface on which information can be formed, as by printing. An information storage and transfer circuit including an RFID integrated circuit and an antenna is carried by the sheet medium. The information storage and transfer circuit is capable of storing an electronic copy of the visible information in read-only form.

A document is prepared by forming the visible version of the information on one or both surfaces of the sheet medium, and storing an identical version of the information in the information storage and transfer circuit. After preparation of the document, the identity of the two versions may be verified by reading out the electronic version and comparing it with the visible version. After verification, the document can be passed on for the intended use.

A document can be checked for authenticity at any time by simply performing the verification process-viz., reading out the electronic version and comparing it with the visible version. If the two versions are identical, the document is genuine and unaltered from its original state.

In order to minimize any inductive interaction between circuits on different adjacent documents, the locations of the circuits can be varied from document to document so that the antennas of the circuits on different documents do not overlap.

In order to aid in the location of a document which has been stored along with other documents, a visible indicator, preferably an LED, is attached to a document along the upper margin. The visible indicator is connected to the RFID circuit and activated thereby whenever information is accessed from the circuit. The locations of the visible indicators may be staggered from document to document in order to facilitate viewing.

The technique disclosed in the above-referenced published patent application provides a convenient solution to the problem of document authentication. Moreover, the relative size of the information storage and transfer circuit is completely compatible with ordinary document paper, and the preparation and verification processes are easy to learn and perform. There are certain documents, however, for which this technique does not provide a complete solution to the problem of document authentication. More specifically, some documents are initially prepared in the conventional manner with spaces left for the insertion of additional information, such as hand-written dates, one or more hand-written signatures, an official seal and the like. Not until these spaces have been filled with the relevant information is a given document of this type legally complete. The above-referenced technique does not account for this additional information filled in after the original document has been prepared and an electronic version of the original information has been stored in the information storage and transfer circuit. Consequently, when a later authentication is performed only the original information can be verified since the later-added information does not appear in the originally prepared version of the document. As a result, for documents of this type only a partial verification can be reliably performed.

SUMMARY OF THE INVENTION

The invention comprises an intelligent document having one or more information storage and transfer circuits which collectively contain not only the information comprising the original version of a document requiring additional fill-in information but also an image of the entire completed document including the fill-in information added after the original document was prepared.

From an apparatus standpoint, the invention comprises an intelligent document including a sheet medium for providing a surface on which document information can be formed in a visible manner to provide a completed document; and an information storage and transfer means carried by the sheet medium for storing an electronic copy of an originally prepared text portion of the document information in a read-only manner and for storing an image of the document in a read-only manner after supplemental information has been added to the originally prepared text portion to complete the document so that verification of the authenticity of the document can be performed by reading out the stored image and comparing it with the visible version formed on the surface of the sheet medium.

In a first embodiment, the information storage and transfer means comprises an RFID tag having a first memory portion for storing the text portion and a second memory portion for storing the image.

In a second embodiment, the information storage and transfer means comprises a first RFID tag having a memory portion for storing the text portion and a second RFID tag having a memory portion for storing the image. From a process standpoint, the invention comprises a method of preparing a self-authenticating intelligent document, the method comprising the steps of:

(a) providing a sheet medium having a surface on which document information can be formed in a visible manner to provide a completed document, and an information storage and transfer means for storing an electronic copy of an originally prepared text portion of the document information in a read-only manner and for storing an image of the document in a read-only manner after supplemental information has been added to the originally prepared text portion to complete the document;

(b) forming a text portion of the document information on the surface of the sheet medium in visible form;

(c) storing an identical version of the text portion of the document information formed in step (b) in the information storage and transfer means in a read-only manner;

(d) forming supplemental information on the surface of the sheet medium in visible form to complete the document; and (e) storing an image of the document after the supplemental information has been formed in step (d) so that the completed document contains a visible version of the document information and an electronic image of the completed document which cannot be altered.

In a first implementation of the process, the step (a) of providing includes the step of providing an RFID tag having a first memory portion for storing the text portion and a second memory portion for storing the image; the step (c) of storing includes the step of storing the text portion in the first memory portion of the RFID tag; and the step (e) of storing includes the step of storing the image in the second memory portion of the RFID tag.

In a second implementation of the process, the step (a) of providing includes the step of providing a first RFID tag having a memory portion for storing the text portion and a second RFID tag having a memory portion for storing the image; the step (c) of storing includes the step of storing the text portion in the memory portion of the first RFID tag; and the step (e) of storing includes the step of storing the image in the memory portion of the second RFID tag.

The method may further include the step of verifying the completed document after initial preparation by reading out the image stored in the information storage and transfer means to enable a comparison between the stored version of the image and the visible version formed on the surface of the sheet medium.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a schematic memory map showing the type of information stored in each of the two information storage and transfer circuits;

FIG. 9 is a schematic memory map showing the types of information stored in each of the two memory portions of the information storage and transfer circuit of the second embodiment;

FIG. 10 is a plan view of an example of the original document text information stored in the text memory of the information storage and transfer circuits in both alternate embodiments of the invention; and FIG. 11 is a plan view of an example of the image of the entire completed document as it appears on the surface of the document and as stored in the image memory of the information storage and transfer circuits in both alternate embodiments of the invention.

DETAILED DESCRIPTION OF THE PREFERRED EMBODIMENTS

The invention has wide application to the field of document preparation, archiving and retrieval.

Figure 1:
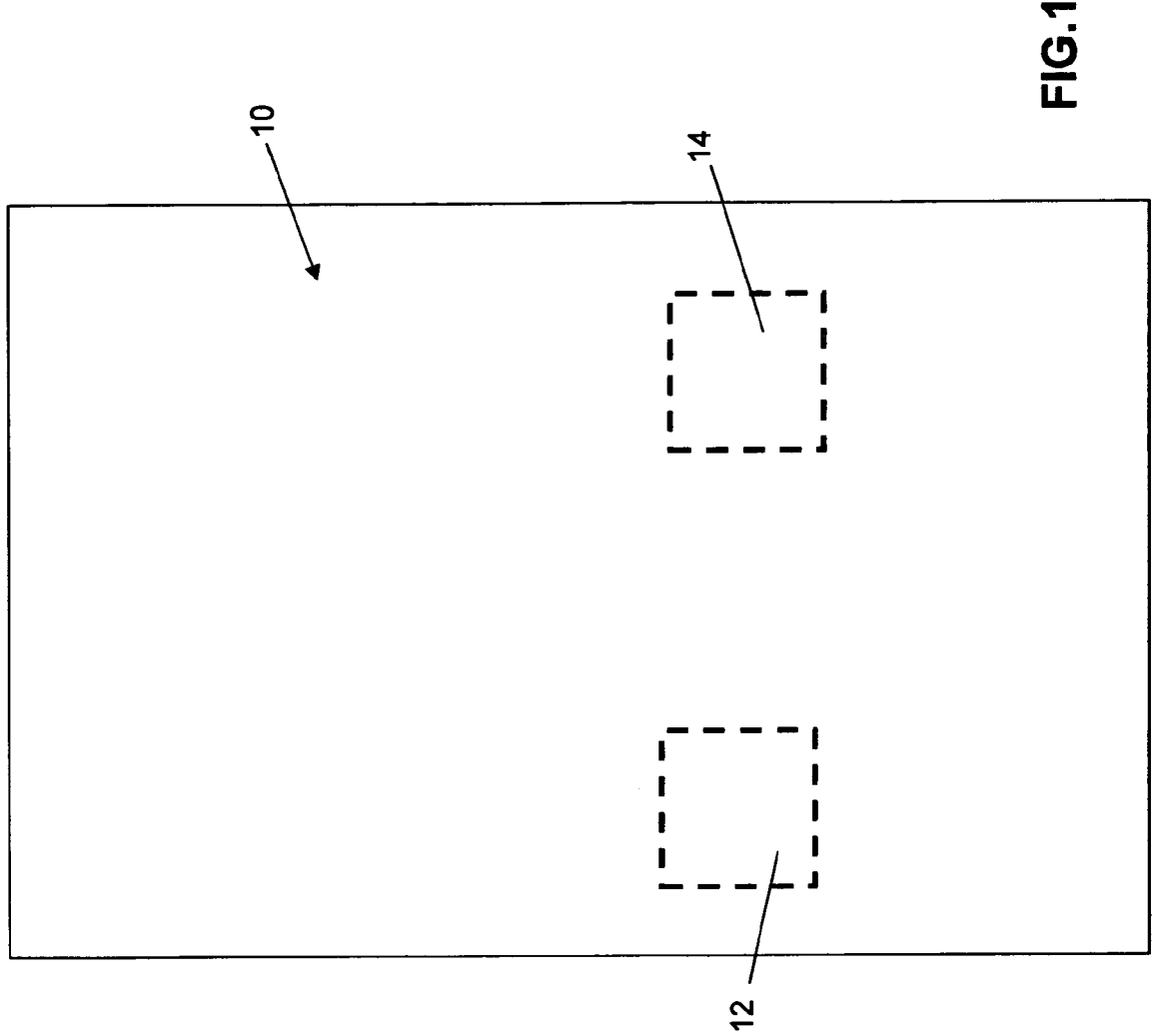
FIG. 1 is a plan view of a document blank according to a first embodiment of the invention and having two information storage and transfer circuits.

Turning now to the drawings, FIG. 1 is a plan view of a document blank according to a first embodiment of the invention. As seen in this FIG., a document blank 10 in sheet media form has a pair of information storage and transfer circuits 12, 14 incorporated therein. Information storage and transfer circuits 12, 14 are RFID tags 12, 14, which are commercially available or a custom-designed integrated circuit devices having the standard internal functional components commonly found in an RFID (radio frequency identification) tag. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram); as well as a loop antenna for enabling power transfer into the RFID tag electronic components and the transfer of information between the RFID tags 12, 14 and conventional external interrogation devices. An example of such an RFID tag is shown and described in U.S. Pat. No. 6,154,137 issued Nov. 28, 2000, the disclosure of which is hereby incorporated by reference. Generally, an ID tag has an antenna and the RFID chip mounted on or encapsulated in a thin substrate, such as a polyethylene terephthalate (PET) substrate. The RFID tag is incorporated into the sheet media, which may be paper, plastic material such as Mylar sheet media, or any other known sheet media material used in the preparation of sheet media documents. Incorporation of the ID tag into the sheet media may be done by adhesion to one of the sheet surfaces, bonding within the sheet media material, or by using any other known technique for firmly embedding the thin plastic ID tag into a sheet media material. Once the sheet media has been prepared by incorporating the ID tag, the sheet is ready for preparation of the document.

When interrogated by an outside device, each RFID tag 12, 14 communicates with the outside device using standard protocols, such as the ISO 14443 protocol or the ISO15693 protocol. The size of RFID tags 12, 14 is on the order of 1.4×1.3 mm, with a thickness of about 0.13 mm. This compares favorably to the average thickness of 0.1 mm for document paper.

Figure 2:
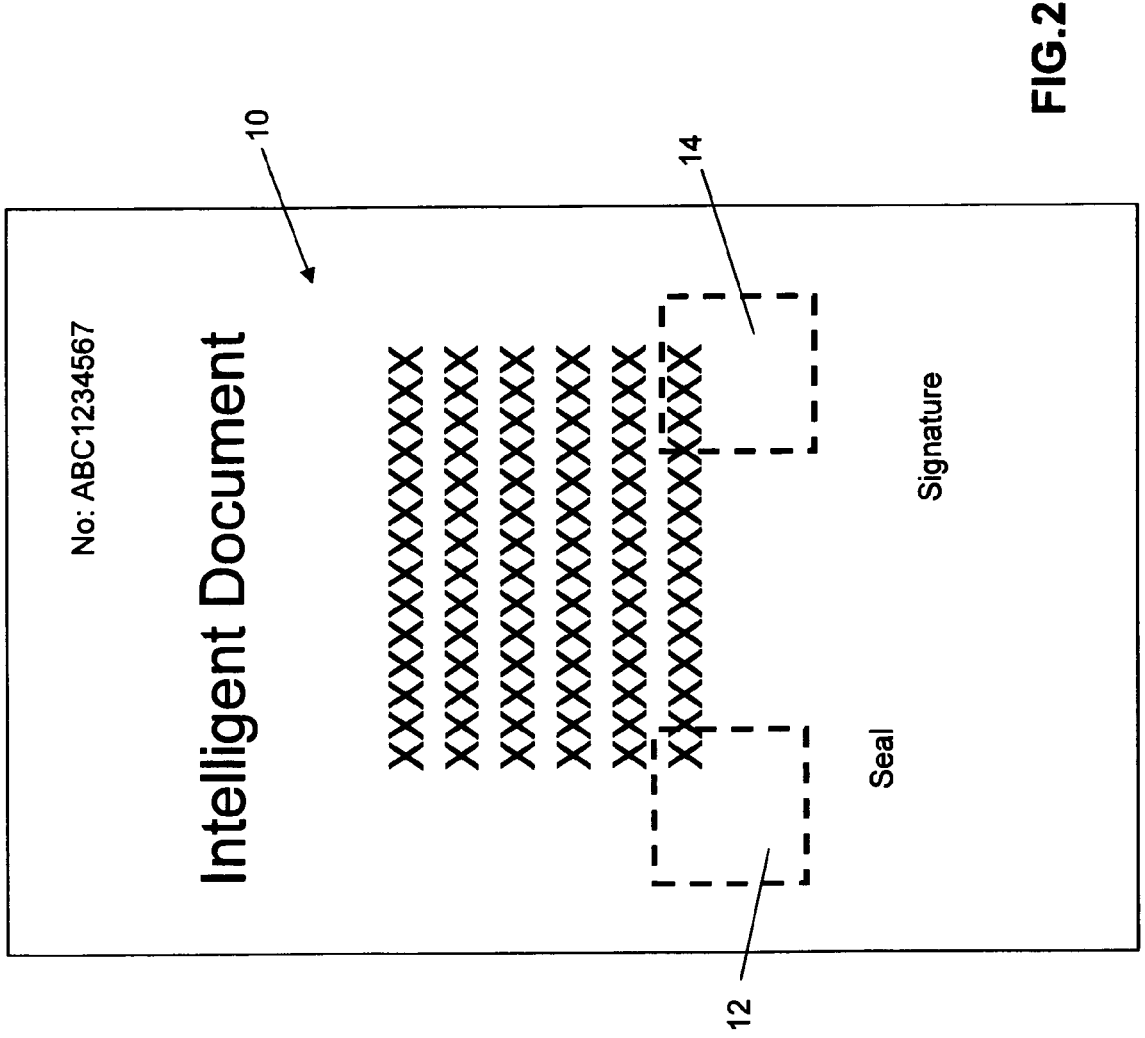
FIG. 2 is a plan view of a document according to the FIG. 1 embodiment of the invention after the original document information has been printed on the document blank and an electronic copy of the original information has been stored in a first one of the information storage and transfer circuits.

As will be described more fully below, when a document is being originally prepared, the predetermined text information to be included in the document is printed onto one or both surfaces of the document blank 10. Printing of the visible information on the document blank surfaces is done by using conventional techniques, such as ink jet printing, laser printing or the equivalent. The exact same information is also written into the ROM (read-only memory) incorporated into the RFID tag 12. Once this information is written once into the ROM, it cannot be written over or otherwise altered by any interrogation device. Stated differently, once the document has been prepared, RFID tag 12 can be interrogated by an outside device and can only supply the document text information to the outside device—i.e, it cannot alter the document information stored in the ROM. FIG. 2 illustrates the appearance of an intelligent document in this intermediate state, with the text information represented by the legends "INTELLIGENT DOCUMENT", "No. ABC1234567", an array of Xs, the legend "Seal", and the legend "Signature". Although only the obverse side of document 10 is shown in FIG. 2, visible information may also be carried by the reverse side of document 10 to provide a two-sided readable document.

Figure 3:
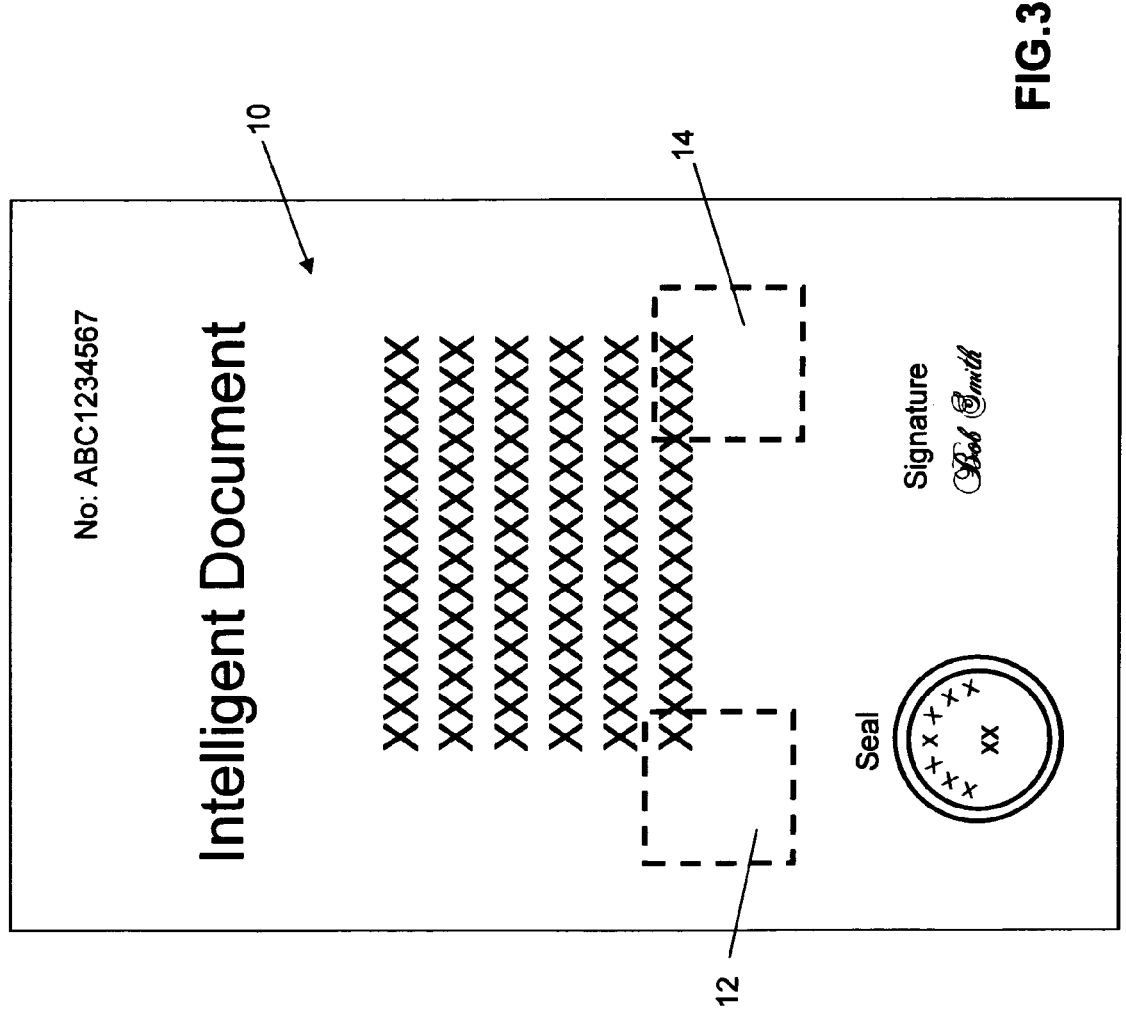
FIG. 3 is a plan view of a document according to the FIG. 1 embodiment of the invention after the information added after the original document was prepared has been completed and an image of the entire completed document including the added information has been stored in the second one of the information storage and transfer circuits.

After a document has been initially prepared by printing the predetermined text information on one or both surfaces of the document blank as shown in FIG. 2, it is completed by adding supplemental post-printing information, such as a hand-written signature, a corporate or governmental seal, a date and the like. When the document has been thus completed, an exact image is prepared using an optical scanner, a digital camera or other optical devices capable of capturing an exact image of the completed document and converting the optical image to digital form. The digital form of the image is then written into the ROM (read-only memory) incorporated into the RFID tag 14. Once this information is written once into the ROM, it cannot be written over or otherwise altered by any interrogation device. Stated differently, once the document has been prepared, RFID tag 14 can be interrogated by an outside device and can only supply the document image information to the outside device—i.e, it cannot alter the document image information stored in the ROM. FIG. 3 illustrates the appearance of an intelligent document in this completed state, with the image information represented by the legends "INTELLIGENT DOCUMENT", "No. ABC1234567", an array of Xs, the legend "Seal", the legend "Signature", the seal appearing under the legend ° Sear, and the signature appearing under the legend "Signature".

FIG. 4 is a schematic memory map showing the type of information stored in each of the two information storage and transfer circuits 12, 14. In this FIG., the memory map of RFID tag 12 is presented in the upper region, while the memory map of RFID tag 14 is presented in the lower region. As seen in this FIG., each RFID tag memory is partitioned into three zones: zone 0, zone 1, and zone 2 or more. Zone 0 contains manufacture information, such as the serial number assigned to the tag by the manufacturer. Zone 1 contains information pertaining to the organization of the information contained in zone 2, such as the page (x-y) location of the various text or image portions. Zone 2 contains the data corresponding to the text information (in RFID tag 12 memory) and image information (in RFID tag 14 memory). For this embodiment, the memory capacity required of RFID tag 12 can be substantially less than that of RFID tag 14 since the amount of memory space required for a typical text document (e.g. 2048 bits) is less than that required for an image of a document (e.g.48K bits). An example of a suitable commercially available RFID tag with a memory capacity of 2048 bits as required by RFID tag 12 is an NXP ICODE SLI-SY HF RFID Smart Label IC available from NXP corporation founded by Phillips Corporation; an example of a suitable commercially available RFID tag with a memory capacity of more than 48K bits as required by RFID tag 14 is a type AT88SC6416CRF 64K bits device available from ATMEL Corporation.

Figure 5:
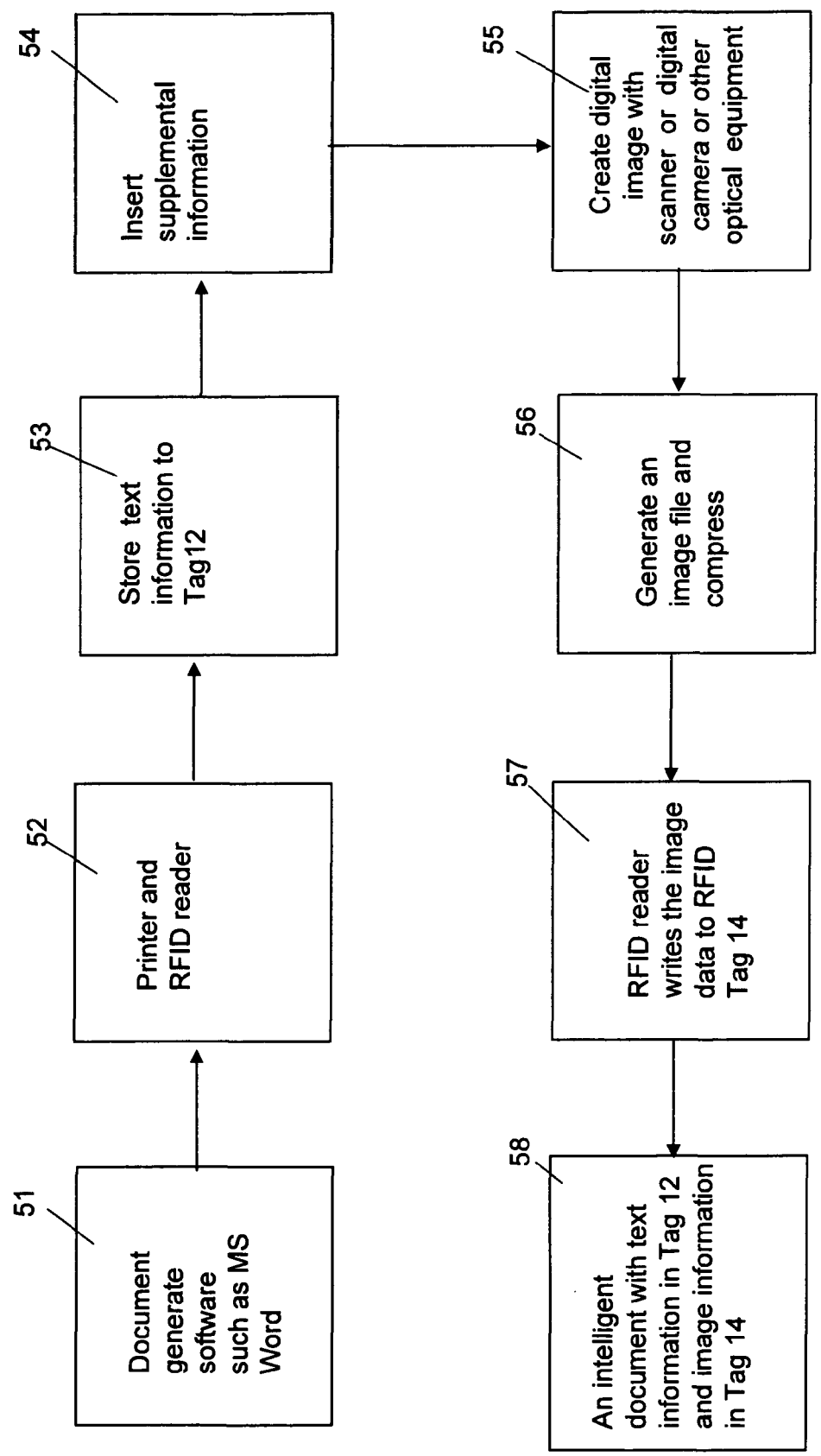
FIG. 5 is schematic block diagram illustrating the preferred method of preparing the document of FIGS. 1-3.

FIG. 5 is schematic block diagram illustrating the general process for preparing a document according to the invention and the equipment used in the intelligent document preparation process. The predetermined text information is first composed in block 51 using a host device, such as a PC, a word processor or any other known device for composing documents. Once the information is composed in block 51, it is printed onto one or both sides of the sheet media 10 (block 52) and prepared for storage in the memory of RFID tag 12 by either using an RFID reader to scan the printed version now visible on the document 10 and convert the scanned version to a digital electronic replica or by using the digital output from the text composing device directly to drive an RFID transmitter to store an exact electronic copy of the predetermined text in the read-only memory of RFID tag 12 (block 53). It is noted that the printing step and the electromagnetic transfer step may both be conducted simultaneously or may be performed sequentially. When both the printing and writing steps are completed, the document is in the intermediate state ready for the insertion or addition of any supplemental information, such as a date, a signature, a corporate seal or the like. After the supplemental information has been added to the document in its intermediate form to complete the document (block 54), an exact image of the completed document is captured using conventional optical devices, such as an image scanner, a digital camera, or the like (block 55). This image is then converted to digital form and compressed (if desired) to form an image file (block 56). The image file is then read into the memory of RFID tag 14. The result is an intelligent document with text information stored in the memory of RFID tag 12 and image information stored in the memory of RFID tag 14. At this point, the now-completed intelligent document can be passed on for further handling.

Figure 6:
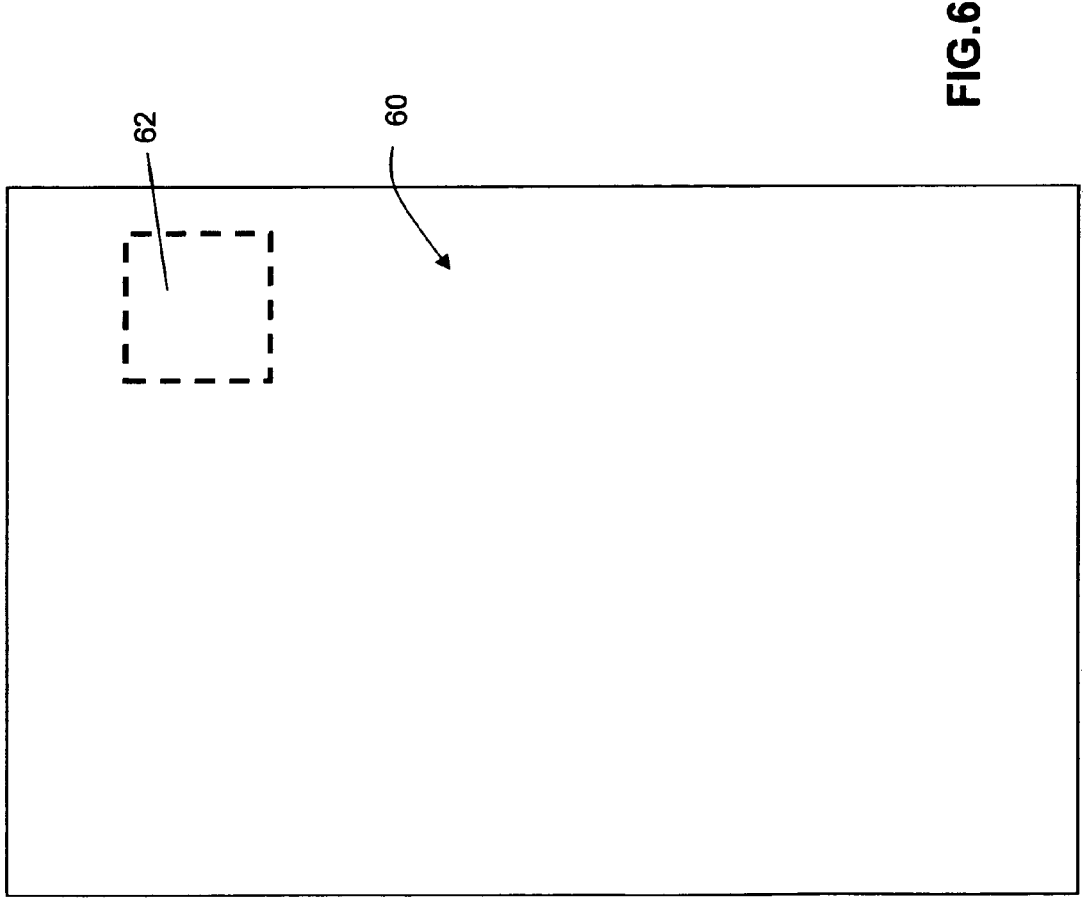
FIG. 6 is a plan view of a document blank according to a second embodiment of the invention and having a single information storage and transfer circuit with expanded memory.
Figure 7:
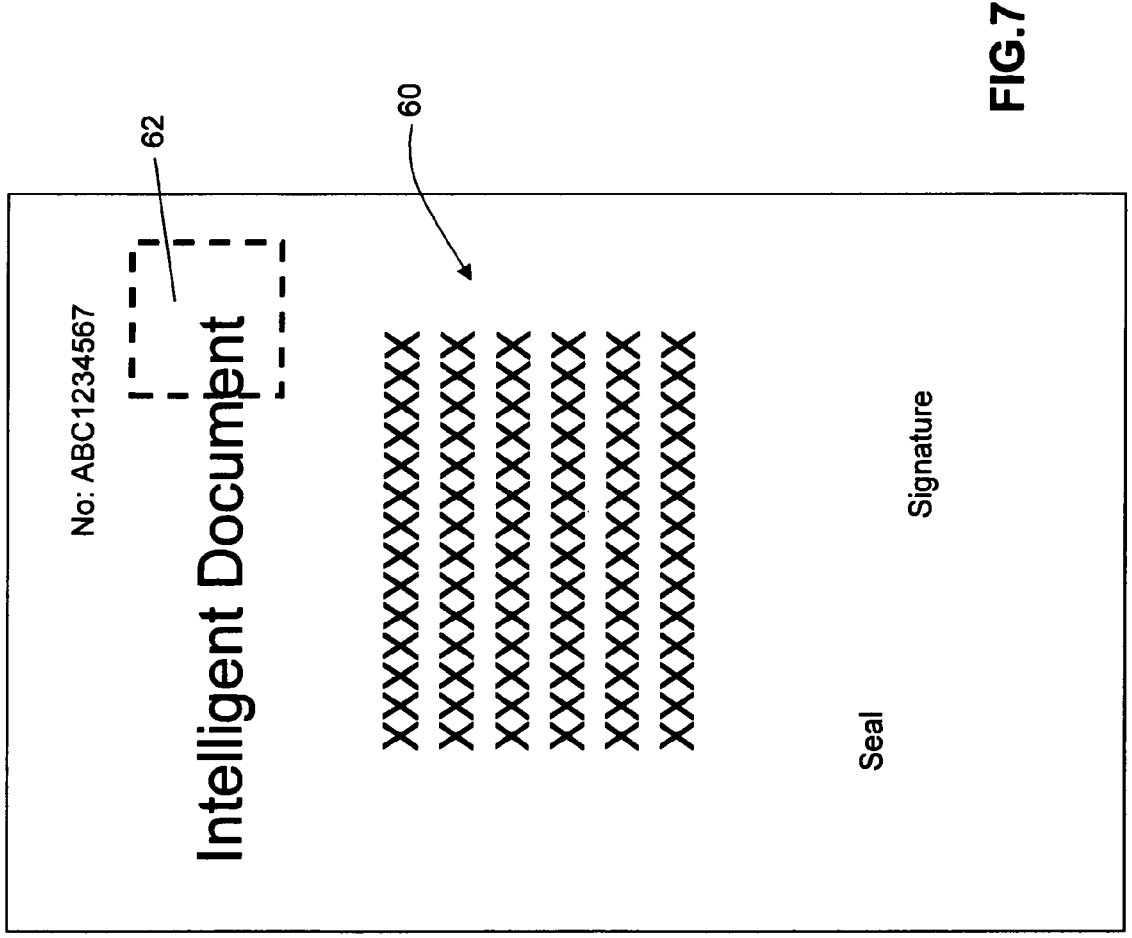
FIG. 7 is a plan view of a document according to the second embodiment the invention after the original document information has been printed on the document blank and an electronic copy of the original information has been stored in a first portion of the memory contained in the single information storage and transfer circuit.

FIGS. 6-9 illustrate a second embodiment of the invention which employs a single RFID tag 62 to store both the predetermined text information for a document as well as the image information for the completed document after the supplemental information has been added. FIG. 6 is a plan view of a document blank 60 according to this second embodiment of the invention. The memory capacity of RFID tag 62 is sufficiently large to store both the predetermined document text information (e.g. about 2048 bits per page of text) and the completed document image information (e.g. about 48K bits). The above referenced type AT88SC6416CRF 64K bits device available from ATMEL Corporation is an example of an RFID tag suitable for this purpose. FIG. 7 illustrates the appearance of an intelligent document 60 in the intermediate state, with the text information represented by the legends "INTELLIGENT DOCUMENT", "No. ABC1234567", an array of Xs, the legend "Seal", and the legend "Signature". Although only the obverse side of document 60 is shown in FIG. 7, visible information may also be carried by the reverse side of document 60 to provide a two-sided readable document. The exact same information is also written into the text portion of the ROM (read-only memory) incorporated into the RFID tag 62.

Figure 8:
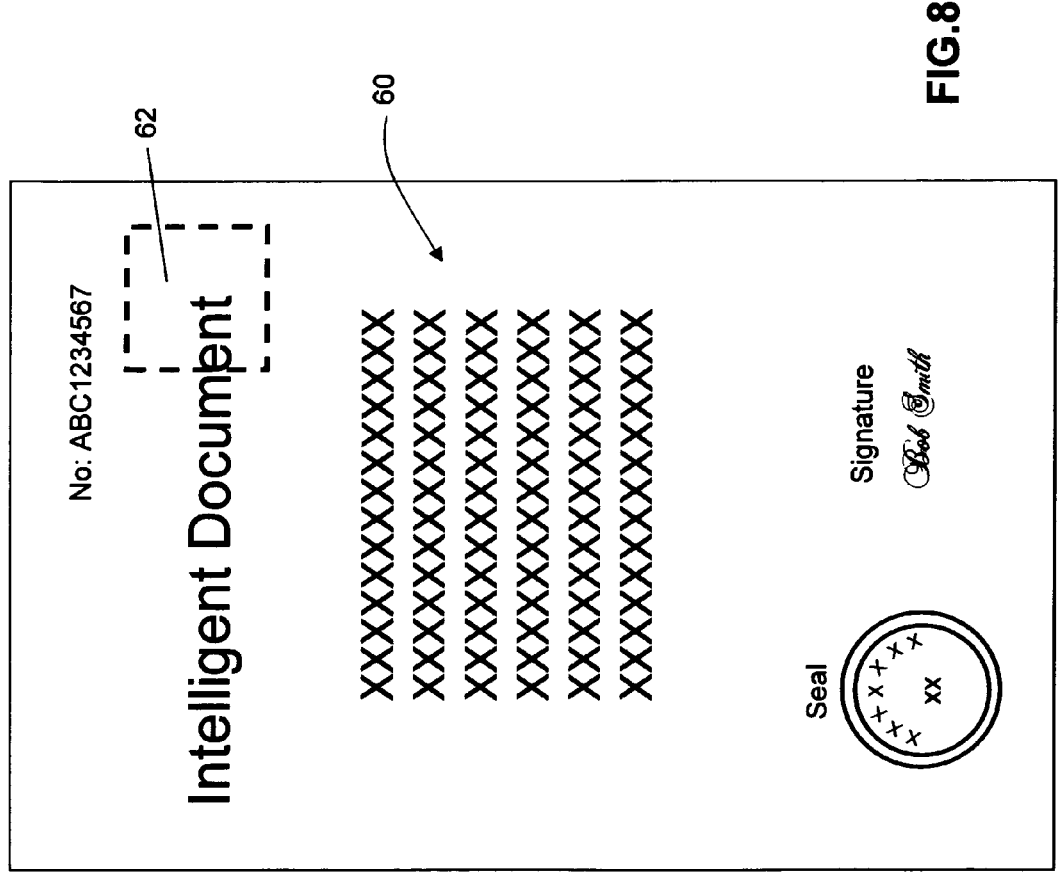
FIG. 8 is a plan view of a document according to the second embodiment of the invention after the supplemental information added after the original document text was prepared has been completed and an image of the entire completed document including the supplemental information has been stored in a second portion of the memory contained in the single information storage and transfer circuit.

After the document has been initially prepared by printing the predetermined text information on one or both surfaces of the document blank as shown in FIG. 7, it is completed by adding supplemental post-printing information, such as a hand-written signature, a corporate or governmental seal, a date and the like. When the document has been thus completed, an exact image is prepared using an optical scanner, a digital camera or other optical devices capable of capturing an exact image of the completed document and converting the optical image to digital form. The digital form of the image is then written into the image portion of the ROM (read-only memory) incorporated into the RFID tag 62. Once this information is written once into the ROM, it cannot be written over or otherwise altered by any interrogation device. Stated differently, once the document has been prepared, RFID tag 62 can be interrogated by an outside device and can only supply the document image information to the outside device—i.e, it cannot alter the document image information stored in the ROM. FIG. 8 illustrates the appearance of an intelligent document in this completed state, with the image information represented by the legends "INTELLIGENT DOCUMENT", "No. ABC1234567", an array of Xs, the legend "Seal", the legend "Signature", the seal appearing under the legend "Seal", and the signature appearing under the legend "Signature".

FIG. 9 is a schematic memory map showing the type of information stored in the information storage and transfer circuit 62. As seen in this FIG., RFID tag 62 memory is partitioned into multiple zones: zone 0, zone 1, zone 2, and zones 3-15. Zone 0 contains manufacture information, such as the serial number assigned to the tag by the manufacturer. Zone 1 contains information pertaining to the organization of the text information contained in zone 2 and the image information contained in zones 3-15, such as the page (x-y) location of the various text or image portions. Zone 2 contains the data corresponding to the text information in RFID tag 62 memory. Zones 3-15 contain the data corresponding to the image information in RFID tag 62 memory. For this embodiment, the memory capacity required of RFID tag 62 must be large enough to contain both the text information and the image information of the document 60. The general process for preparing a document according to the invention illustrated in FIGS. 6-9 for the second embodiment and the equipment used in the intelligent document preparation process are essentially the same as those described above with reference to FIG. 5 for the first embodiment, with the exception that both the text data and the image data are written into the memory of the single RFID tag 62.

Figure 11:
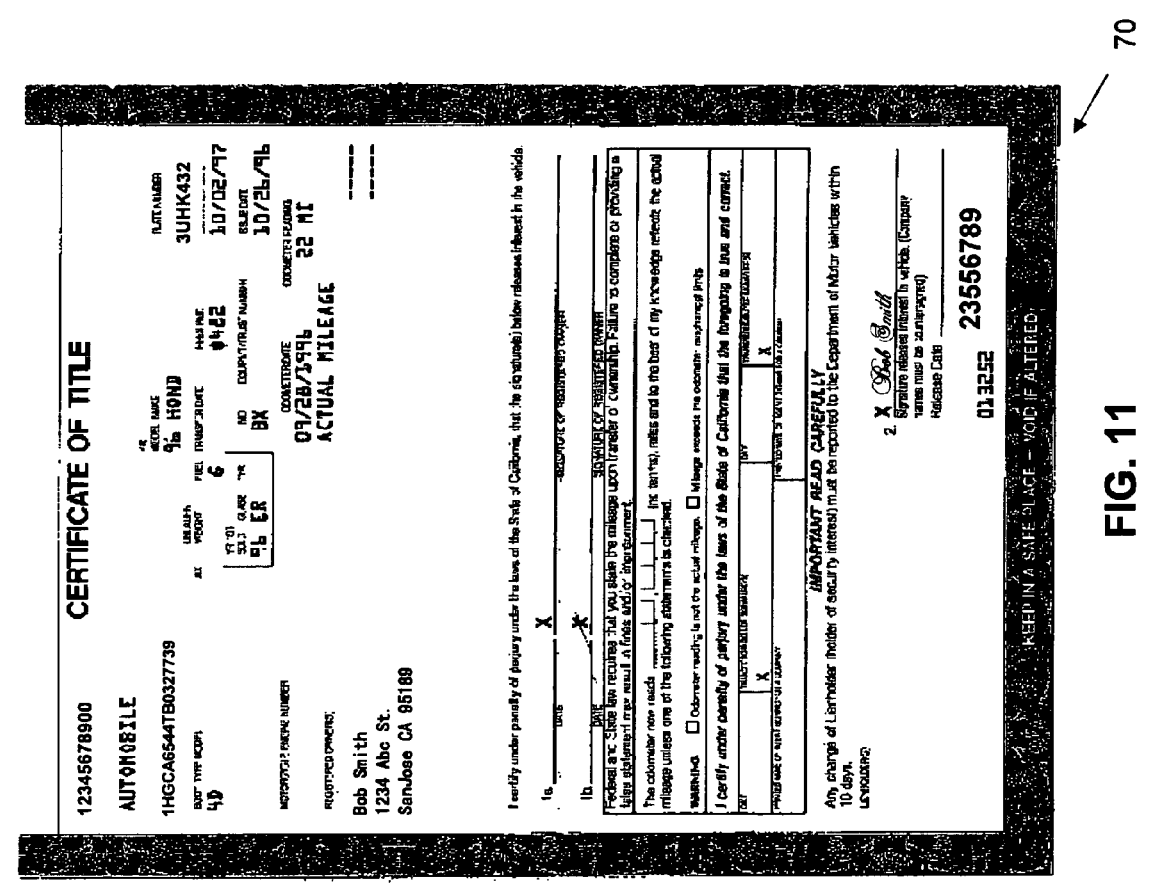

FIG. 10 is an example of the type of text information which can be stored in the RFID tag(s) for an automotive certificate of title, while FIG. 11 is an example of an image of an automotive certificate of title 70. As is evident from visual inspection, the image contains supplemental information in the form of a hand-written date, two signatures, and a title number CA593575 all added after preparation of the initial text. Thus, the title document can be verified at any time after preparation of the document 70 by reading out the image information from the RFID tag(s) and comparing this image with that printed on the surface of the document. Any differences will be visually evident and will show the changes made to the original.

It is noted that the originally prepared text portion may include characters other than letters of the alphabet, such as punctuation marks, special symbols, and the like. In addition, a part of the originally prepared text may include graphic symbols which are common to or invariant in documents of a particular type, such as the border surrounding document 70 illustrated in FIG. 11.

Once a document has been prepared according to the invention, it can be verified by reading out the image information stored in the ROM portion of RFID tag 14 or the image portion of the RFID tag 62 memory and comparing the electronic version of the image information with the original printed version. This verification process is similar to that described in the above-referenced U.S. Patent Application no. U.S. 2004/0044956 A1 published Mar. 4, 2004. A conventional lap-top computer having a keyboard and a display is provided with a read antenna at a convenient location, such as around the perimeter of the keyboard. The read antenna is connected to the CPU inside the computer using one of the standard interfaces normally found in such computers. The computer also has installed therein a computer program which is functionally capable of controlling the interrogation process using the protocols incorporated into the RFID tags 14, 62 so that the document image information in the memory of RFID tags 14, 62 can be extracted by interrogation and stored in the memory of the computer. To extract the image information, the document 10, 60 is placed on the keyboard and the computer is operated to start the interrogation process. The read antenna functions to transfer power into the RFID tag 14, 62 located on document 10, 60 and to transfer the information received via the antenna incorporated into the RFID tag 14, 62 into the CPU of the computer. Once extracted, the information can be displayed on the computer display and the displayed version can be visually compared with the original printed version. In addition, if desired, the displayed version can be printed out onto a sheet media blank, and this print-out can be compared with the original. As will be apparent, any variation between the original and the extracted version will prove that the original has been altered.

As will now be apparent, the invention enables the preparation of information-bearing documents which are extremely secure and self-authenticating. More specifically, for documents which are initially prepared in the conventional manner with spaces left for the insertion of additional or supplemental information, such as hand-written dates, one or more hand-written signatures, an official seal and the like, the invention enables complete verification of the authenticity of the document. More particularly, when a later authentication is performed the entire contents of the document as finally completed can be verified since the additional or supplemental information appears in the extracted image. Moreover, these advantages are provided according to the invention without adding substantial cost and without rendering the document cumbersome due to the relatively modest cost and small size of the RFID tags 12, 14, 62. Preparation of intelligent documents is relatively straight-forward, and can be easily taught to office workers. The verification process is likewise easy to learn and to perform. Lastly, by providing a separate electronic copy of the original text information, this information can be read out from the RFID tag memory in relatively rapid fashion (as compared to reading out the entire image of the completed document) should this be required or deemed desirable in a given application.

While the invention has been described with reference to particular implementations, other particular implementations may be employed, as desired, Therefore, the above should not be construed as limiting the invention, which is defined by the appended claims.

What is claimed is:

1. A method of preparing a self-authenticating intelligent document, said method comprising the steps of:
   (a) providing a single sheet of copy medium having a surface on which document information can be formed in a visible manner to provide a completed document having an originally prepared complete text portion and supplemental information added after the originally prepared complete text portion has been formed on said surface, and an information storage and transfer means for storing an electronic copy of an image of said completed document in a read-only manner after the supplemental information has been added to the originally prepared complete text portion to complete the document;
   (b) forming an originally prepared complete text portion of said document information on said surface of said single sheet of copy medium in visible form;
   (c) then, after step (b) of forming is completed, forming supplemental information on said surface of said single sheet of copy medium in visible form after said originally prepared complete text portion of said document information has been formed on said surface of said single sheet of copy medium to produce a completed document;
   (d) creating an electronic copy of an image of said completed document by scanning said completed document; and
   (e) storing said electronic copy of said image of said completed document in said information storage and transfer means so that said single sheet of copy medium contains a visible version of the completed document information and an electronic image of the completed document which cannot be altered.

2. The method of claim 1 wherein said step (a) of providing includes the step of providing an RFID tag having a memory portion for storing said electronic copy of said image; and wherein said step (e) of storing includes the step of storing said electronic copy of said image in said memory portion of said RFID tag.

3. The method of claim 1 wherein said step (a) of providing includes the step of providing an information storage and transfer means for storing an electronic copy of the originally prepared complete text portion of said document information in a read-only manner; and further including the step (f) of storing an electronic copy of the originally prepared complete text portion of said document information formed in step (b) in the information storage and transfer means in a read-only manner.

4. The method of claim 1 further including the step of verifying the completed document after initial preparation by reading out the electronic copy of said image stored in the information storage and transfer means to enable a comparison between the stored version of the image and said document information formed in a visible manner on said surface.

5. The method of claim 3 wherein said step (a) of providing includes the step of providing a first RFID tag having a memory portion for storing said originally prepared complete text portion and a second RFID tag having a memory portion for storing said electronic copy of said image; wherein said step (f) of storing includes the step of storing said originally prepared complete text portion in the memory portion of said first RFID tag; and wherein said step (e) of storing includes the step of storing said electronic copy of said image in the memory portion of said second RFID tag.

6. The method of claim 3 wherein said step (a) of providing includes the step of providing an RFID tag having a first memory portion for storing said originally prepared complete text portion and a second memory portion for storing said electronic copy of said image; wherein said step (f) of storing includes the step of storing said originally prepared complete text portion in the first memory portion of said RFID tag; and wherein said step (e) of storing includes the step of storing said electronic copy of said image in the second memory portion of said RFID tag.

\* \* \* \* \*